(12) United States Patent
De Cicco et al.

(10) Patent No.: US 9,923,459 B2
(45) Date of Patent: Mar. 20, 2018

(54) CHARGE PUMP

(71) Applicant: Infineon Technologies AG, Neubiberg (DE)

(72) Inventors: Adolfo De Cicco, Castel d'Azzano (IT); Bernard Blaise Tchodjie Tchamabe, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/922,043

(22) Filed: Oct. 23, 2015

(65) Prior Publication Data

US 2016/0118879 A1    Apr. 28, 2016

(30) Foreign Application Priority Data

Oct. 23, 2014  (DE) .................. 10 2014 115 433

(51) Int. Cl.
*G05F 1/10* (2006.01)
*G05F 3/02* (2006.01)
*H02M 3/07* (2006.01)

(52) U.S. Cl.
CPC .................. *H02M 3/073* (2013.01)

(58) Field of Classification Search
CPC .. H02M 3/073; H02M 3/07; H02M 2003/077; G11C 5/145; G05F 3/205
USPC ......................................................... 327/536
See application file for complete search history.

(56) References Cited

U.S. PATENT DOCUMENTS

| | | | | |
|---|---|---|---|---|
| 7,208,996 B2 * | 4/2007 | Suzuki | .................. | H02M 3/073 327/157 |
| 7,843,446 B2 * | 11/2010 | Park | ..................... | G09G 3/3648 345/100 |
| 9,396,115 B2 * | 7/2016 | Blainey | ............... | G06F 12/0833 |
| 2013/0093503 A1 * | 4/2013 | Kok | ........................ | H02M 3/07 327/536 |

FOREIGN PATENT DOCUMENTS

JP    2003284325 A   * 10/2003

OTHER PUBLICATIONS

Cho et al., "Two-Phase Boosted Voltage Generator for Low-Voltage DRAMs," IEEE Journal of Solid-State Circuits, vol. 38, No. 10, Oct. 2003, pp. 1726-1729.
Gregori, "Voltage doubler with improved driving capability and no-short circuit losses," Electronics Letters, vol. 46, No. 17, Aug. 19, 2010, pp. 1193-1194.
Su et al., "High Efficiency Cross-Coupled Doubler with No Reversion Loss," Proceedings of the 2006 IEEE International Symposium on Circuits and Systems, vol. 6, May 21-24, 2006, pp. 2761-2764.

\* cited by examiner

*Primary Examiner* — Quan Tra
(74) *Attorney, Agent, or Firm* — Shumaker & Sieffert, P.A.

(57) ABSTRACT

Charge-pump devices and corresponding methods are disclosed. A control input of a valve transistor of the charge pump device may be coupled with one of an input terminal or an output terminal via a further transistor.

16 Claims, 4 Drawing Sheets

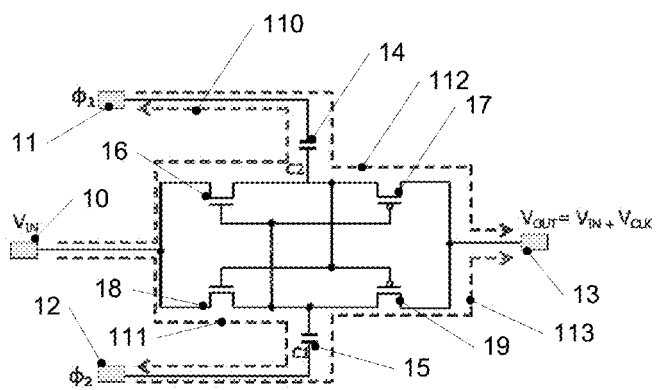
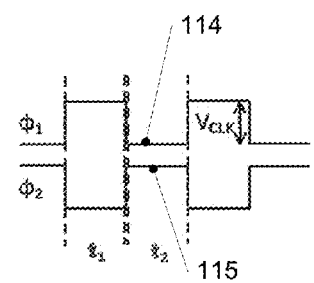
Fig. 1A
Fig. 1B
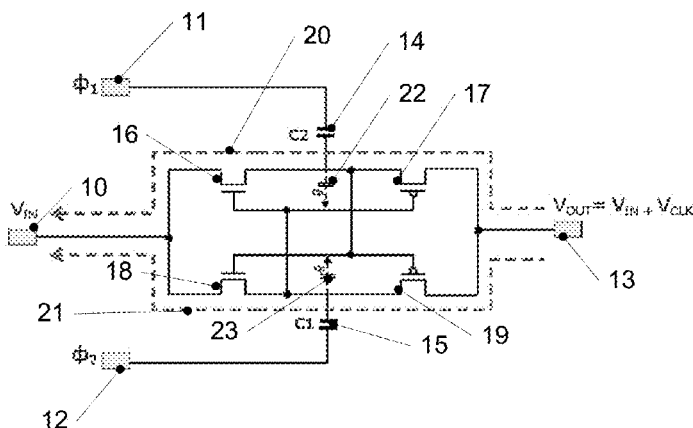
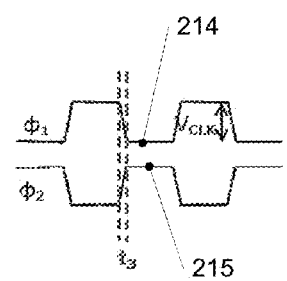
Fig. 2A
Fig. 2B

CHARGE PUMP

RELATED APPLICATIONS

The instant Application claims priority of German Patent Application No. 102014115433.9, which was filed on Oct. 23, 2014. The entire contents of the identified German Patent Application No. 102014115433.9 are hereby incorporated herein by reference.

BACKGROUND

Charge pumps are circuits that can pump charge to generate an output voltage higher than an input voltage. The input voltage may for example be a supply voltage. Therefore, charge pumps may be, for example, employed in circuits where a voltage higher than a supply voltage is needed.

Some charge pumps are based on transistors, for example MOS (Metal Oxide Semiconductor) transistors. In some instances, parasitic capacitances of such transistors may adversely affect the performance of the charge pump.

BRIEF DESCRIPTION OF THE DRAWINGS

FIG. 1A is a circuit diagram of a charge pump device for illustrating some basic operating principles used in some embodiments.

FIG. 1B is a schematic diagram illustrating clock signals usable in the circuit of FIG. 1A.

FIG. 2A is a representation of the charge pump device of FIG. 1A with parasitic capacitances.

FIG. 2B illustrates clock signals usable in the circuit of FIG. 2A.

DETAILED DESCRIPTION

Figure 3A:
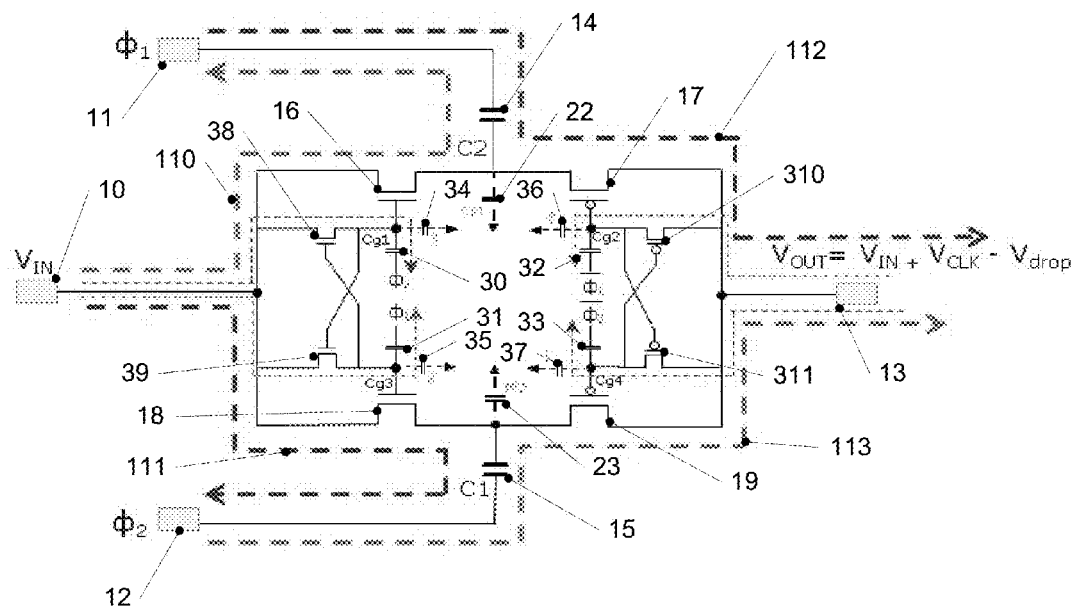
FIG. 3A is a circuit diagram of a charge pump device using additional gate boosting.

In the following, embodiments will be discussed in detail referring to the attached drawings. It is to be noted that these embodiments serve as illustrative examples only and are not to be construed as limiting. For example, while some embodiments may be described as comprising a plurality of features or elements, in other embodiments some of these features or elements may be omitted and/or may be replaced by alternative features or elements without departing from the scope of the present application. In yet other embodiments, additional features or elements in addition to the ones explicitly shown and described may be provided.

Implementations described herein may provide improved charge pump devices and associated methods where problems caused by parasitic capacitances are at least mitigated.

In the embodiments, any connections or couplings between elements may be provided as a direct connection or coupling, i.e. a connection or coupling without additional intervening elements (for example only a metal connection), or may be provided as an indirect connection or coupling, i.e. a connection or couplings with one or more intervening elements as long as the general purpose of the connection or coupling, for example to transmit a certain kind of signal or information, is not substantially altered.

Some embodiments relate to charge pump devices. Charge-pump devices are devices that may be used to convert an input voltage to an output voltage higher than the input voltage. In some embodiments, charge pumps may comprise two pairs of valve transistors to selectively charge and discharge boost capacitors. A control input of at least one valve transistor of the pairs may be selectively coupled to an input terminal or an output terminal of the charge pump. In some embodiments, by selectively coupling the control terminal of the transistor with the input terminal or the output terminal, problems regarding parasitic capacitances may be mitigated. In some embodiments, the selective coupling is essentially based on a clock signal also used for operating the charge pump.

Some embodiments discussed in the following comprise transistors. While in the embodiments discussed MOS (Metal Oxide Semiconductor) transistors may be used for illustrative purposes, in other embodiments other kinds of transistors, for example other kinds of field effect transistors or also bipolar transistors or mixtures thereof like insulated gate bipolar transistors (IGBTs), may be used. Generically, transistors may be described as comprising a control terminal and first and second load terminals. In case of a field effect transistor, for example the control terminal may correspond to a gate terminal, and the first and second load terminals may correspond to source and drain terminals. In case of a bipolar transistor, the control terminal may correspond to a base terminal, and the first and second load terminals may correspond to collector and emitter terminals.

An off-state of a transistor generally may refer to a state where the transistor is high-ohmic (essentially non-conducting) between its load terminals, and an on-state may refer to a state where the transistor is low-ohmic (essentially conducting) between its load terminals.

In the following explanations, first with reference to FIGS. 1 to 3, some concepts and properties of charge pumps usable in embodiments will be discussed. Then, with reference to FIG. 4, an embodiment of a charge pump will be discussed in detail. To avoid repetitions, throughout FIGS. 1 to 4, corresponding elements are denoted with the same reference numerals and will not be described repetitively in detail.

In FIG. 1A, a circuit diagram of a single stage charge pump is illustrated. FIG. 1B illustrates clock signals 114 $\phi_1$ and 115 $\phi_2$ usable when operating the charge pump of FIG. 1A.

The charge pump illustrated in FIG. 1A comprises essentially a first inverter and a second inverter, an input of the first inverter coupled with the output of the second inverter and vice-versa. In the example of FIG. 1A, a first inverter may be formed by an NMOS transistor 16 and a PMOS transistor 17. The second inverter may be formed by an NMOS transistor 18 and a PMOS transistor 19. Transistors 16 to 19 may also be referred to as valve transistors. A first load terminal of NMOS transistors 16, 18 is coupled with a voltage input terminal 10. Second load terminals of NMOS transistors 16, 18 are coupled with respective first load terminals of PMOS transistors 17, 19. Second load terminals of PMOS transistors 17, 19 are coupled with a voltage output terminal 13.

Furthermore, an output node of the first inverter (i.e. a node between the second load terminal of NMOS transistor 16 and the first load terminal of PMOS transistor 17) is coupled to a first clock input terminal 11 via a boost capacitance 14, which may have a capacitance value C2. An output node of the second inverter, i.e. a node between the second load terminal of NMOS transistor 18 and the first load terminal of PMOS transistor 19, is coupled with a second clock input terminal 12 via a second boost capacitor 15, which may have a capacitance value C1. C1 may be equal to C2. A first clock signal $\phi 1$, labeled 114 in FIG. 1B, may be supplied to first clock input terminal 11, and a second clock signal $\phi_2$, labeled 115 in FIG. 1B, may be supplied to second clock terminal 12.

Generally, with a charge pump as illustrated in FIG. 1A, each of boost capacitors 14, 15 is charged during one phase of operation and discharged during the respective other phase of operation. This will now be explained in some more detail using the clock signals of FIG. 1B as an example.

In a first phase $t_1$ (where $\phi 1$ is high and $\phi_2$ is low), boost capacitance 15 is charged by an input voltage at input voltage terminal 10 via NMOS transistor 18, as indicated by an arrow 111. Furthermore, boost capacitance 14 is discharged to output terminal 16 via PMOS transistor 17, as indicated by an arrow 112. In other words, during the time $t_1$ NMOS transistor 18 and PMOS transistor 17 are conducting between their load terminals, while NMOS transistor 16 and PMOS transistor 19 are non-conducting via the load terminal. Conducting between load terminals in this case means that a low resistance is present between the load terminals (also referred to as on-resistance $R_{ON}$ of the respective transistor), while non-conducting implies that the respective transistor is high-ohmic between its load terminals.

In this case, an output voltage $V_{OUT}$ is equal to an input voltage $V_{IN}$ at input terminal 10 plus a voltage $V_{CLK}$ based on the clock signal (see FIG. 1B).

In FIG. 1B, clock signals $\phi_1$, $\phi_2$ are shown for an ideal case, e.g. as having vertical edges. Therefore, in such an ideal case, the switching of transistors 16 to 19 between conducting and non-conducting states may happen simultaneously.

In real implementations, clock signals may be non-ideal, as illustrated in FIG. 2B for a first clock signal $\phi_1$ 214 and second clock signal $\phi_2$ 215. In FIG. 2A, essentially the charge pump device of FIG. 1A is reproduced again. Additionally, parasitic capacitances 22, 23 between the output nodes of the first and second inverters and ground are illustrated. Such parasitic capacitances for example may be capacitances inherent to transistors 16 to 19. Generally, in many circuit designs the presence of such parasitic capacitances may be inevitable.

The effect of non-ideal clock signals as illustrated in FIG. 2B in some cases may be that during a transition time $t_3$ all transistors 16 to 19 may be at least somewhat conducting concurrently, which may lead to a short circuit between input terminal 10 and output terminal 13 as illustrated by arrows 20, 21.

Furthermore, parasitic capacitance 22 together with boost capacitance 14 may form a parasitic capacitive divider, and likewise capacitance 23 together with boost capacitance 15 may form a parasitic divider. These dividers may reduce the output voltage of the voltage pump e.g. to $V_{OUT}=[V_{IN}+V_{CLK}][C1/(C1+Cp)]$, assuming that C1=C2 and Cp being the value of parasitic capacitances 22, 23. Furthermore, in some cases it may happen that due to parasitic capacitances 22, 23 one or more of transistors 16 to 19 is/are not switched on correctly or fully, which effectively may lead to a higher resistance and therefore to a higher voltage drop across transistors 16 to 19.

FIG. 3A illustrates a further device which is adapted to mitigate some of the above issues. The circuit of FIG. 3A comprises additional gate boosting capacitors 30 to 33, each of transistors 30 to 33 receiving a clock signal and being coupled to one of the gate terminals of transistors 16 to 19, as illustrated in FIG. 3A, instead of the inverter cross-coupling of FIGS. 1A and 2A. 33 to 37 denote additional parasitic capacitances. Therefore, in FIG. 3 the "inverters" are no longer cross-coupled, but the transistors of the "inverters" of FIGS. 1 and 2 are biased by clock signals via capacitances 30 to 33. Furthermore, the charge pump device of FIG. 3A comprises a cross-coupled NMOS transistor pair 38, 39 coupled between gate terminals of NMOS transistors 16, 18 and input terminal 10 and a cross-coupled PMOS transistor pair 310, 311 coupled between gate terminals of PMOS transistors 17, 19 and output terminal 13 as illustrated. Cross-coupled transistors 38 to 311 serve for improving switching off (i.e. switching to a non-conducting state between load terminals) of transistors 16 to 19.

Figure 3B:
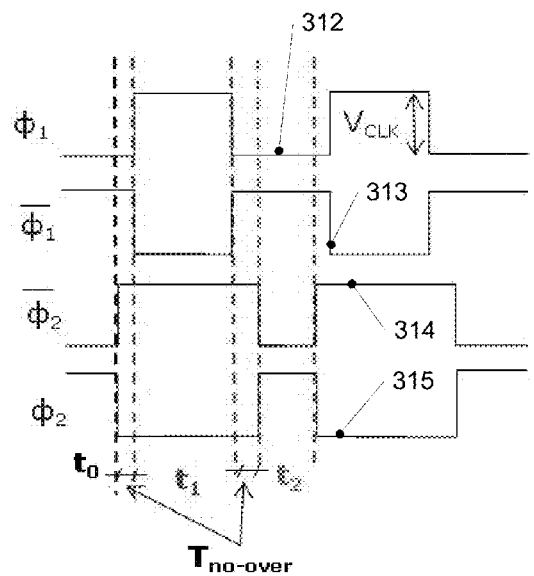
FIG. 3B is a diagram illustrating clock signals usable in the charge pump device of FIG. 3A.

The charge pump device illustrated in FIG. 3A may use non-overlapping clocks as illustrated in FIG. 3B. A clock signal $\phi_1$ is labeled 312, the inverted clock signal $\phi_1$, $\bar{\phi}_1$, is labeled 313, a clock signal $\phi_2$ is labeled 315 and the inverted clock signal $\phi_2$, $\bar{\phi}_2$, is labeled 314 in FIG. 1. As illustrated in FIG. 3B, there is a period, labeled $T_{non\text{-}over}$ and having a duration to where all transistors 16 to 19 are turned off. This in some embodiments may prevent a short circuit as illustrated by arrows 20, 21 in FIG. 2A.

For example, to illustrate this, after a phase where boost transistor 14 has been charged to $V_{IN}$ as illustrated by arrow 110 and as explained previously and boost capacitor 15 has been discharged as illustrated by 113, before transitioning to the next discharging/charging phase, for example $\phi_1$ and $\phi_2$ are both low (during the time $T_{non\text{-}over}$).

During this phase $T_{non\text{-}over}$ voltages at capacitors 30, are close to the input voltage $V_{IN}$, causing transistors 16, 18 to be off (non-conducting). Furthermore, capacitors 32, 33 in this case are close to the output voltage $V_{OUT}$, such that PMOS transistors 17, 19 are also off, such that no short circuit current may flow.

After this phase, in the example $\phi_2$ remains low while $\phi_1$ goes high (time $t_1$ in FIG. 3B). This boosts (by $\phi_1$) transistor 31 to $V_{IN}+V_{CLK}$, switching transistor 18 on, which in turn charges capacitor 15 to $V_{IN}$ (arrow 111). Furthermore, by NMOS 38 capacitor 30 is boosted to the input value $V_{IN}$, turning transistor 16 off. Furthermore, by applying $\bar{\phi}_1$ to capacitor 32, capacitor 32 is boosted down approximately to the input voltage $V_{IN}$, turning transistor 17 on, such that charge may be transferred from capacitor 14 to output terminal 13, as indicated by arrow 112. Furthermore, by PMOS transistor 311 a gate of transistor 19 is boosted to $V_{OUT}$, which turns transistor 19 off.

At the end of the phase $t_1$, another time period $T_{non\text{-}over}$ follows similar to what was described above, and then during a time period $t_2$ the above situation of $t_1$ is reversed. The output voltage for the charge pump circuit of FIG. 3A may be equal to $V_{IN}+V_{CLK}$ minus a voltage drop $V_{drop}$ caused e.g. by a voltage drop over valve transistors 16-19.

In the charge pump device of FIG. 3A, during the phases $T_{non\text{-}over}$ the gates of PMOS transistor 17, 19 are biased to be close to $V_{IN}+V_{CLK}$ (i.e. close to $V_{OUT}$), and transistors 16, 18 are biased such that the gate voltages are close to $V_{IN}$. However, the gates in this case are in a somewhat floating condition (no ohmic connection to a defined potential), and their equivalent capacitance may be comparable with parasitic capacitances 34 to 37. This may lead to the formation of a capacitive divider leading to a discharge of the gate voltage, still providing some risk of a short circuit. Furthermore, during the phases $t_1$ or $t_2$ a gate of one of NMOS transistors 16, 18 is boosted to $V_{IN}+V_{CLK}$, but also here the gate of this transistor in the example of FIG. 3A is at a high impedance and somewhat floating. The capacitive divider formed by capacitors 30, 34 or 31, 35 may then lead to a degradation of a voltage swing at output terminal 13 and/or a not fully switching on of the respective transistor, leading to a higher on-resistance and to a higher voltage drop, increasing e.g. $V_{drop}$. Similar issues may occur with PMOS transistors 17, 19 when their gates are driven to be at or near $V_{IN}$. This may lead to a reduction of efficiency of the charge pump device illustrated in FIG. 3A.

Figure 4A:
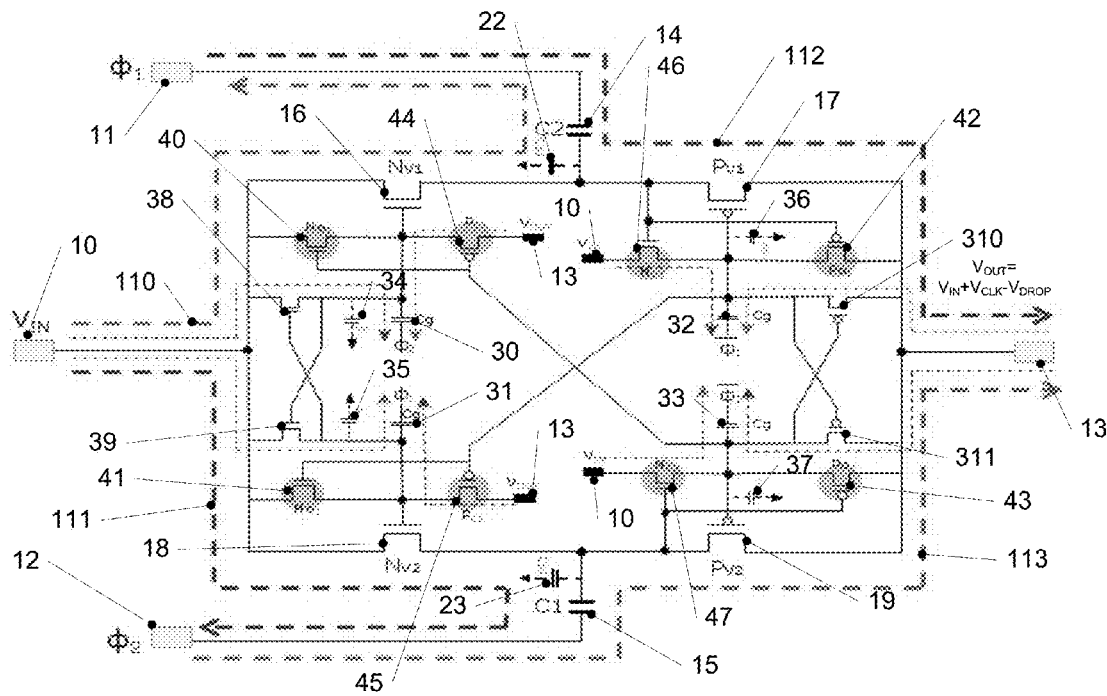
FIG. 4A is a circuit diagram of a charge pump device according to an embodiment.

In FIG. 4A, a circuit diagram illustrating a charge pump device according to an embodiment is illustrated. The embodiment in FIG. 4A is based on the charge pump devices discussed with reference to FIGS. 1 to 3, and like elements bear the same reference numerals and will not be discussed again in detail. However, the techniques discussed with reference to FIG. 4A may also be applied to other charge pump devices than the charge pump devices explicitly discussed with reference to FIGS. 1 to 3, for example to charge pump devices having more than one stage.

In the embodiment of FIG. 4A, compared to FIG. 3A additionally further transistors 40 to 47 are provided. Transistor 40 in the embodiment of FIG. 4A is an NMOS transistor. A first load terminal of transistor 40 is coupled with input voltage terminal 10 and a second load terminal of transistor 40 is coupled with the gate terminal of transistor 16. A gate terminal of transistor 40 is coupled to output terminal 13 via transistor 311.

Transistor 41, which in the example of FIG. 4A is an NMOS transistor, has a first load terminal coupled to input voltage terminal 10 and a second load terminal coupled to the gate terminal of transistor 18. A gate terminal of transistor 41 is coupled to output voltage terminal 13 via transistor 310.

Transistor 42, which is a PMOS transistor in the embodiment of FIG. 4, has a first load terminal coupled to output terminal 13 and a second load terminal coupled to the gate terminal of transistor 17. A gate terminal of transistor 42 is coupled with boost capacitor 14.

In a similar manner, transistor 43, which is a PMOS transistor, has a first load terminal coupled to output voltage terminal 13 and a second load terminal coupled to a gate terminal of transistor 19. A gate terminal of transistor 43 is coupled with the node between transistors 18 and 19, i.e. with second boost capacitor 15 as shown.

A load terminal of transistor 44, which is a PMOS transistor in the embodiment of FIG. 4A, is coupled with output voltage terminal 13. A second load terminal of transistor 42 is coupled with a gate terminal of transistor 16. A gate terminal of transistor 44 is coupled with output voltage terminal 13 via transistor 311 as illustrated.

In a similar manner, a first load terminal of transistor 45, which is a PMOS transistor in the example of FIG. 4A, is coupled with output voltage terminal 13. A second load terminal of transistor 45 is coupled with the gate terminal of transistor 18. A gate terminal of transistor 45 is coupled to output voltage terminal 13 via transistor 310 as shown. It should be noted that for ease of representation output voltage terminal 13 is represented three times in FIG. 4A, which, however, in embodiments this may always represent the same output voltage terminal and connections thereto.

A first load terminal of transistor 46, which is an NMOS transistor in the example of FIG. 4A, is coupled with input voltage terminal 10. A second load terminal of transistor 46 is coupled with the gate terminal of transistor 17, and a gate terminal of transistor 46 is coupled with the node between transistors 16 and 17, i.e. with first boost capacitance 14. Likewise, a first load terminal of transistor 47, which is an NMOS transistor in the example of FIG. 4A, is coupled with input voltage terminal 10, and a second load terminal of transistor 47 is coupled with the gate terminal of transistor 19. A gate terminal of transistor 47 is coupled with the node between transistors 18 and 19, i.e. with second boost capacitance 15. It should be noted while in FIG. 4A, four transistors 40 to 47 are represented, in other embodiments only some of these transistors or only one of these transistors may be present. In particular, transistors 40 to 47 may be used independently from each other in embodiments.

As explained previously, during the non-overlapping periods $T_{non-over}$ (time periods $t_0$) all transistors 16 to 19 should be turned off, but in the case of FIG. 3A, the gates are somewhat floating, and a voltage discharge may happen. In the embodiment of FIG. 4A, transistors 40, 41, 42 and 43 are on during this phase $T_{non-over}$. Therefore, during $T_{non-over}$ via transistors 40 and 41, the gate voltages of transistors 16 and 18 are driven to $V_{IN}$, and via transistors 42 and 43, the gate voltages of transistors 17 and 19 are driven to $V_{OUT}$, which ensures that all transistors 16 to 19 are off. Therefore, transistors 40 to 43 contribute to ensuring that transistors 16 to 19, respectively, are off during periods $T_{non-over}$.

Figure 4B:
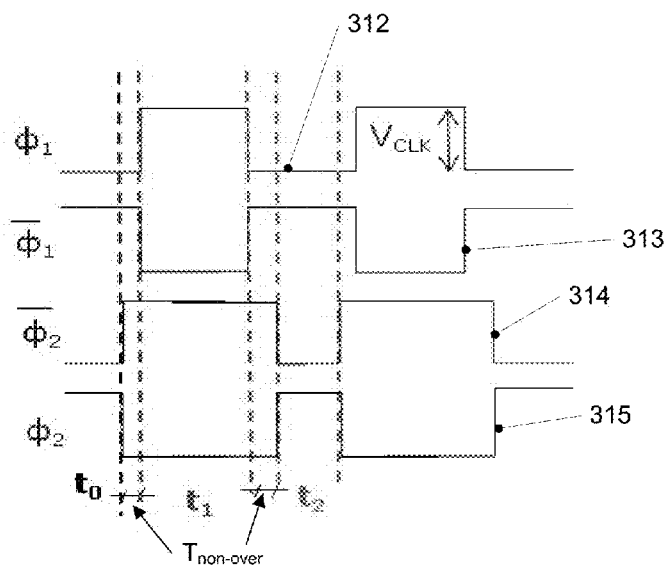
FIG. 4B illustrates clock signals usable in the charge pump device of FIG. 4A.

To illustrate the operation further, during the phase $t_1$ $\phi_1$ in the example of FIG. 4B is high and $\phi_2$ is low. This means, for example, that PMOS transistor 41 is turned on (driven by $\overline{\phi}_1$ via capacitor 32). However, due to parasitic capacitances, for example a divider formed by capacitors 32 and 36, and/or by capacitors 14 and 22 the voltage at the gate of transistor 17 in the embodiment of FIG. 3A as described previously may not be completely low, which may lead to a higher on-resistance of transistor 17. In the embodiment of FIG. 4A, transistor 46 is additionally provided which provides a charge compensation compensating loss of charge at the gate of transistor 17 e.g. due to parasitic capacitance 36. In particular, transistor 46 during time $t_1$ may couple the gate of transistor 17 with input voltage terminal 10, which may ensure in embodiments that transistor is fully on. Furthermore, during time $t_1$ the gate of transistor 18 is biased to be high by $\phi_1$ via capacitor 31, turning transistor 18 on. Also in this case, a capacitive divider generated by parasitic capacitance 35 in the embodiment of FIG. 3A may lead to transistor 18 not being completely on, which in turn leads to a higher on-resistance. In the embodiment of FIG. 4A, during time $t_1$, transistor 41 may couple essentially the gate of transistor 18 to output voltage terminal 13, which helps to compensate charge loss due to parasitic capacitance 35 and which may ensure that transistor 18 is fully on, reducing a voltage drop over transistor 18.

During time period $t_2$, transistors 44 and 47 assist in ensuring that transistors 16 and 19 are on in essentially the same manner as explained for transistors 17 and 18 during time period $t_1$. In other words, transistor 44 provides charge compensation to the gate of transistor 16, ensuring that transistor 16 is fully on, and NMOS transistor 47 ensures that transistor 19 is fully on.

The following table illustrates the conditions of various transistors during stages $t_0$, $t_1$ and $t_2$.

| | \multicolumn{12}{c}{Transistor no.} | | | | | | | | | | | |
|---|---|---|---|---|---|---|---|---|---|---|---|---|
| | 16 | 18 | 17 | 19 | 46 | 47 | 44 | 45 | 40 | 41 | 42 | 43 |
| $t_0$ | Off | Off | Off | Off | Off | Off | Off | Off | On | On | On | On |
| $t_1$ | Off | On | On | Off | On | Off | Off | On | Don't care | Don't care | Don't care | Don't care |
| $t_2$ | On | Off | Off | On | Off | On | On | Off | Don't care | Don't care | Don't care | Don't care |

It is to be emphasized again that in other embodiments only some or only one of transistors 40 to 47 may be present. Apart from the modifications described above, the embodiment of FIG. 4A may operate similarly to the charge pump device explained with reference to FIG. 3A.

In some embodiments, providing one or more of transistors 40 to 47 may decrease a voltage drop over transistors 16 to 19 due to parasitic capacitances, thus increasing efficiency and output voltage, and/or may avoid a risk of a short circuit current. In some embodiments, providing one or more of transistors 40 to 47 may save chip area compared to solutions where capacitors like capacitors 14, 15 or 30 to 32 are designed to be significantly larger than the respective parasitic capacitances, and/or the parasitic capacitances are designed to be small by designing the corresponding transistors accordingly. In other embodiments, other techniques may be employed.

The above described embodiments serve only as examples, and techniques disclosed herein may also be applied to other kinds of charge pump devices.

Figure 5:
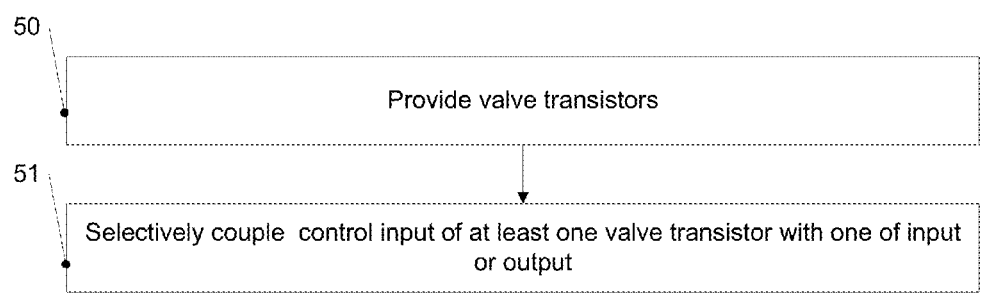
FIG. 5 is a flow chart illustrating a method according to an embodiment.

FIG. 5 illustrates a method according to an embodiment. The method of FIG. 5 may be implemented using embodiments described previously, but may also be used independently therefrom.

At 50, valve transistors are provided, valve transistors being e.g. transistors like transistors 16 to 19 described previously which selectively couple a boost capacitor like capacitors 14 or 15 described previously with one of a voltage input or a voltage output. At 51, the method comprises coupling a control input of at least one of the valve transistors with one of the voltage input or voltage output in a selective manner, e.g. depending on a phase of operations. Such a coupling may for example be realised by transistors like transistors 40 to 47 of FIG. 4A. The selective coupling may be in addition to any coupling provided by cross-coupled transistors like transistors 38 to 311 of FIG. 4A. Other methods may also be employed.

The invention claimed is:

1. A charge pump device, comprising:
a voltage input terminal,
a voltage output terminal,
a first valve transistor, a first load terminal of the first valve transistor being coupled with the voltage input terminal and a second load terminal of the first valve transistor being coupled with a first boost capacitor,
a second valve transistor, a first load terminal of the second valve transistor being coupled with the voltage output terminal and a second load terminal of the second valve transistor being coupled with the first terminal of the first capacitor,
a third valve transistor, a first load terminal of the third valve transistor being coupled with the voltage input terminal and a second load terminal of the third valve transistor being coupled with a first terminal of a second boost capacitor,
a fourth valve transistor, a first terminal of the fourth valve transistor being coupled with the voltage output terminal and a second load terminal of the fourth valve transistor being coupled with the first terminal of the second boost capacitor, and
at least one further transistor, a first load terminal of the at least one further transistor being coupled to a control terminal of one of the first to fourth valve transistors, a second load terminal of the at least one further transistor being coupled with one of the voltage input terminal or the voltage output terminal, and a control terminal of the at least one further transistor being coupled to one of the first terminal of the first boost capacitor, the first terminal of the second boost capacitor or the voltage output terminal,
wherein a second terminal of the first boost capacitor is coupled with a first clock input to receive a first clock signal, and wherein the second terminal of the second boost capacitor is coupled with a second clock terminal to receive a second clock signal, and
wherein the first clock signal and the second clock signal have first phases where the first clock signal is high and the second clock signal is low, second phases where the first clock signal is low and the second clock signal is high, and third phases separating the first and second phases where both the first and second clock signals are low.

2. The charge pump device of claim 1, wherein the first and third valve transistors comprise NMOS transistors, and wherein the second and fourth valve transistors comprise PMOS transistors.

3. The device of claim 1, comprising a first cross-coupled transistor pair between control terminals of the first and third valve transistor and the voltage input terminal, and/or a second cross-coupled transistor pair between control terminals of the second and fourth valve transistors and the voltage output terminal.

4. The device of claim 3, wherein the at least one further transistor comprises a first further transistor, a first load terminal of the first further transistor being coupled with a control terminal of the first valve transistor, a second load terminal of the first further transistor being coupled to the voltage input terminal, and the control terminal of the first further transistor being coupled to the voltage output terminal via a transistor of the second cross-coupled transistor there.

5. The device of claim 3, wherein the at least one further transistor comprises a second further transistor, a first load terminal of the second further transistor being coupled to a control terminal of the third valve transistor, a second load terminal of the second further transistor being coupled to the voltage input terminal, and a control terminal of the second further transistor being coupled to the voltage output terminal via a transistor of the second cross-coupled transistor pair.

6. The device of claim 3, wherein the at least one further transistor comprises a third further transistor, a first load terminal of the third further transistor being coupled to the controlled terminal of the first valve transistor, a second load terminal of the third further transistor being coupled to the voltage output terminal and a control terminal of the third further transistor being coupled to the voltage output terminal via a transistor of the second cross-coupled transistor pair.

7. The device of claim 3, wherein the at least one further transistor comprises a fourth further transistor, a first load terminal of the fourth further transistor being coupled to the controlled terminal of the third valve transistor, a second load terminal of the fourth further transistor being coupled to the voltage output terminal and a control terminal of the fourth further transistor being coupled to the voltage output terminal via a transistor of the second cross-coupled transistor pair.

8. The device of claim 1, wherein the at least one further transistor comprises a fifth further transistor, a first load terminal of the fifth further transistor being coupled to the control terminal of the second valve transistor, a second load terminal of the fifth further transistor being coupled to the voltage output terminal and a control terminal of the fifth further transistor being coupled with the first terminal of the first boost capacitor.

9. The device of claim 1, wherein the at least one further transistor comprises a sixth further transistor, a first load terminal of the sixth further transistor being coupled to a control terminal of the fourth valve transistor, a second load terminal of the sixth further transistor being coupled to the voltage output terminal and a control terminal of the sixth further transistor being coupled to the first terminal of the second boost capacitor.

10. The device of claim 1, wherein the at least one further transistor comprises a seventh further transistor, a first load terminal of the seventh further transistor being coupled to a control terminal of the second valve transistor, a second load terminal of the seventh further transistor being coupled to the voltage input terminal, and a control terminal of the seventh further transistor being coupled with the first terminal of the first boost capacitor.

11. The device of claim 1, wherein the at least one further transistor comprises an eighth further transistor, a first load terminal of the eighth further transistor being coupled with the control terminal of the fourth valve transistor, a second load terminal of the eighth further transistor being coupled to the voltage input terminal, and a control terminal of the eighth further transistor being coupled with the first terminal of the second boost capacitor.

12. The device of claim 4, wherein the first, second, seventh and/or eighth further transistor comprises an NMOS transistor, and/or the third, fourth, fifth and/or sixth further transistor comprises a PMOS transistor.

13. The device of claim 1, wherein the at least one further transistor is adapted to provide charge compensation to compensate for effects of at least one parasitic capacitor.

14. A charge pump device, comprising:
a voltage input terminal,
a voltage output terminal,
a first valve transistor, a first load terminal of the first valve transistor being coupled with the voltage input terminal and a second load terminal of the first valve transistor being coupled with a first boost capacitor,
a second valve transistor, a first load terminal of the second valve transistor being coupled with the voltage output terminal and a second load terminal of the second valve transistor being coupled with the first terminal of the first capacitor,
a third valve transistor, a first load terminal of the third valve transistor being coupled with the voltage input terminal and a second load terminal of the third valve transistor being coupled with a first terminal of a second boost capacitor,
a fourth valve transistor, a first terminal of the fourth valve transistor being coupled with the voltage output terminal and a second load terminal of the fourth valve transistor being coupled with the first terminal of the second boost capacitor, and
at least one further transistor, a first load terminal of the at least one further transistor being coupled to a control terminal of one of the first to fourth valve transistors, a second load terminal of the at least one further transistor being coupled with one of the voltage input terminal or the voltage output terminal, and a control terminal of the at least one further transistor being coupled to one of the first terminal of the first boost capacitor, the first terminal of the second boost capacitor or the voltage output terminal,
wherein a second terminal of the first boost capacitor is coupled with a first clock input to receive a first clock signal, and wherein the second terminal of the second boost capacitor is coupled with a second clock terminal to receive a second clock signal, and
wherein a control input of the first valve transistor is coupled with the second clock terminal, wherein a control input of the second valve transistor is coupled with a third clock terminal to receive the inverted first clock signal, wherein a control input of the third valve transistor is coupled with a first clock terminal and wherein a control input of the fourth valve transistor is coupled with a fourth clock input to receive the inverted second clock signal.

15. A charge pump device, comprising:
a voltage input terminal,
a voltage output terminal,
a first valve transistor, a first load terminal of the first valve transistor being coupled with the voltage input terminal and a second load terminal of the first valve transistor being coupled with a first boost capacitor,
a second valve transistor, a first load terminal of the second valve transistor being coupled with the voltage output terminal and a second load terminal of the second valve transistor being coupled with the first terminal of the first capacitor,
a third valve transistor, a first load terminal of the third valve transistor being coupled with the voltage input terminal and a second load terminal of the third valve transistor being coupled with a first terminal of a second boost capacitor,
a fourth valve transistor, a first terminal of the fourth valve transistor being coupled with the voltage output terminal and a second load terminal of the fourth valve transistor being coupled with the first terminal of the second boost capacitor, and
at least one further transistor, a first load terminal of the at least one further transistor being coupled to a control terminal of one of the first to fourth valve transistors, a second load terminal of the at least one further transistor being coupled with one of the voltage input terminal or the voltage output terminal, and a control terminal of the at least one further transistor being coupled to one of the first terminal of the first boost capacitor, the first terminal of the second boost capacitor or the voltage output terminal,
wherein the at least one further transistor comprises a further transistor, a first load terminal of the further transistor being coupled to a control terminal of the second valve transistor, a second load terminal of the further transistor being coupled to the voltage input terminal, and a control terminal of the further transistor being coupled with the first terminal of the first boost capacitor.

16. A charge pump device, comprising:
a voltage input terminal,
a voltage output terminal,
a first valve transistor, a first load terminal of the first valve transistor being coupled with the voltage input terminal and a second load terminal of the first valve transistor being coupled with a first boost capacitor, a second valve transistor, a first load terminal of the second valve transistor being coupled with the voltage output terminal and a second load terminal of the second valve transistor being coupled with the first terminal of the first capacitor, a third valve transistor, a first load terminal of the third valve transistor being coupled with the voltage input terminal and a second load terminal of the third valve transistor being coupled with a first terminal of a second boost capacitor, a fourth valve transistor, a first terminal of the fourth valve transistor being coupled with the voltage output terminal and a second load terminal of the fourth valve transistor being coupled with the first terminal of the second boost capacitor, and at least one further transistor, a first load terminal of the at least one further transistor being coupled to a control terminal of one of the first to fourth valve transistors, a second load terminal of the at least one further transistor being coupled with one of the voltage input terminal or the voltage output terminal, and a control terminal of the at least one further transistor being coupled to one of the first terminal of the first boost capacitor, the first terminal of the second boost capacitor or the voltage output terminal, wherein the at least one further transistor comprises a further transistor, a first load terminal of the further transistor being coupled with the control terminal of the fourth valve transistor, a second load terminal of the further transistor being coupled to the voltage input terminal, and a control terminal of the further transistor being coupled with the first terminal of the second boost capacitor.

* * * * *